US005672863A

United States Patent [19]

Nicks et al.

[11] Patent Number: 5,672,863

[45] Date of Patent: Sep. 30, 1997

[54] ANTI-DITHER OPTICAL CONTAINER SENSOR WITH SENSORS SEPARATION MEASUREMENT

[75] Inventors: Timothy J. Nicks, Maumee; John L. Waugaman, Perrysburg; Alan D. Ahl, Toledo, all of Ohio

[73] Assignee: Owens-Brockway Glass Container Inc., Toledo, Ohio

[21] Appl. No.: 752,770

[22] Filed: Nov. 20, 1996

Related U.S. Application Data

[63] Continuation of Ser. No. 476,925, Jun. 7, 1995, abandoned.

[51] Int. Cl.$^6$ ........................ G01N 9/04

[52] U.S. Cl. ................ 250/223 B; 250/221; 250/559.47; 356/240; 377/6

[58] Field of Search ............ 250/223 B, 222.1, 250/222.2, 223 R, 224, 559.32, 559.47, 559.4; 356/240, 239, 242; 377/6, 15, 53

[56] References Cited

U.S. PATENT DOCUMENTS

| | | | |
|---|---|---|---|
| 3,482,132 | 12/1969 | Emde . | |
| 3,665,444 | 5/1972 | Scott | 250/223 B |
| 3,740,532 | 6/1973 | Esch . | |
| 3,793,508 | 2/1974 | Maggi . | |
| 3,811,648 | 5/1974 | Ream, Jr. et al. | 250/578 |
| 3,955,179 | 5/1976 | Planke | 250/223 B |
| 3,982,107 | 9/1976 | Butler . | |
| 4,000,400 | 12/1976 | Elder . | |
| 4,081,661 | 3/1978 | Durbin . | |
| 4,158,625 | 6/1979 | Takahashi et al. | 250/223 B |
| 4,303,851 | 12/1981 | Mottier | 377/6 |
| 4,528,679 | 7/1985 | Shahbaz et al. | 377/6 |
| 4,799,243 | 1/1989 | Zepke | 377/6 |
| 4,831,638 | 5/1989 | Dabby et al. | 377/6 |
| 5,003,563 | 3/1991 | Passmore | 250/223 B |

FOREIGN PATENT DOCUMENTS

| | | |
|---|---|---|
| 63-123186 | 5/1988 | Japan . |

*Primary Examiner*—Que Le

[57] ABSTRACT

Apparatus for detecting containers of predetermined diameter that includes a pair of optical proximity sensors positioned adjacent to a container conveyor such that light energy from the sensors is incident sequentially on the containers as the containers pass on the conveyor adjacent to the sensors. The sensors are adjustably positionable with respect to each other such that the sensors are spaced from each other in the direction of container motion on the conveyor. An electronic circuit is coupled to the sensors for detecting passage of containers on the conveyor while ignoring dithering of the containers. In the preferred embodiment of the invention, the sensors are mounted on a common support having a scale for measuring separation between the sensors. Printed indicia in units of container diameter, preferably in both English and metric units, is affixed to the support adjacent to the scale. One of the sensors is mounted on the support adjacent to a "zero" reference point on the scale indicia, and the other sensor is adjustably positionable on the support adjacent to the scale. The support in the preferred embodiment of the invention takes the form of a housing enclosing the sensors and having an elongated window parallel to the conveyor through which containers on the conveyor are exposed to the sensors.

8 Claims, 2 Drawing Sheets

ANTI-DITHER OPTICAL CONTAINER SENSOR WITH SENSORS SEPARATION MEASUREMENT

This application is a continuation of application(s) Ser. No. 08/476,925 filed on Jun. 7, 1995, now abandoned.

The present invention is directed to detection of containers as they pass on a conveyor, and more particularly to an apparatus and method for ignoring dither of the containers on the conveyor.

BACKGROUND AND SUMMARY OF THE INVENTION

In container handling and filling systems, it is important to be able accurately to count containers as they travel along a transport conveyor. However, a problem is often encountered when there is stoppage and backup of containers on the conveyor. The container transport conveyor normally continues to run under these circumstances, and causes the containers to vibrate or dither against each other. The forward and backward vibration of the container can cause erroneous counting, such as multiple counting of a single container.

It is a general object of the present invention to provide a technique for detecting containers on such a transport conveyor while ignoring vibration and dithering of the containers when backup and stoppage occurs. Another and more specific object of the present invention is to provide a method and apparatus for detecting containers as described that are readily adjustable in the field for containers of differing size (e.g., diameter and height). A further object of the present invention is to provide an electro-optical apparatus and method for detecting containers as described that are readily adjustable for containers of differing optical characteristics.

Apparatus for detecting containers in accordance with the present invention includes a pair of optical proximity sensors positioned adjacent to a container conveyor such that light energy from the sensors is incident sequentially on the containers as the containers pass on the conveyor adjacent to the sensors. The sensors are adjustably positionable with respect to each other such that the sensors are spaced from each other in the direction of container motion on the conveyor. An electronic circuit is coupled to the sensors for detecting passage of containers on the conveyor while ignoring dithering of the containers. In the preferred embodiment of the invention, the sensors are mounted on a common support having a scale for measuring separation between the sensors. Printed indicia in units of container diameter, preferably in both English and metric units, is affixed to the support adjacent to the scale. One of the sensors is mounted on the support adjacent to a "zero" reference point on the scale indicia, and the other sensor is adjustably positionable on the support adjacent to the scale. The support in the preferred embodiment of the invention takes the form of a housing enclosing the sensors and having an elongated window parallel to the conveyor through which containers on the conveyor are exposed to the sensors.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF PREFERRED EMBODIMENT

Figure 1:
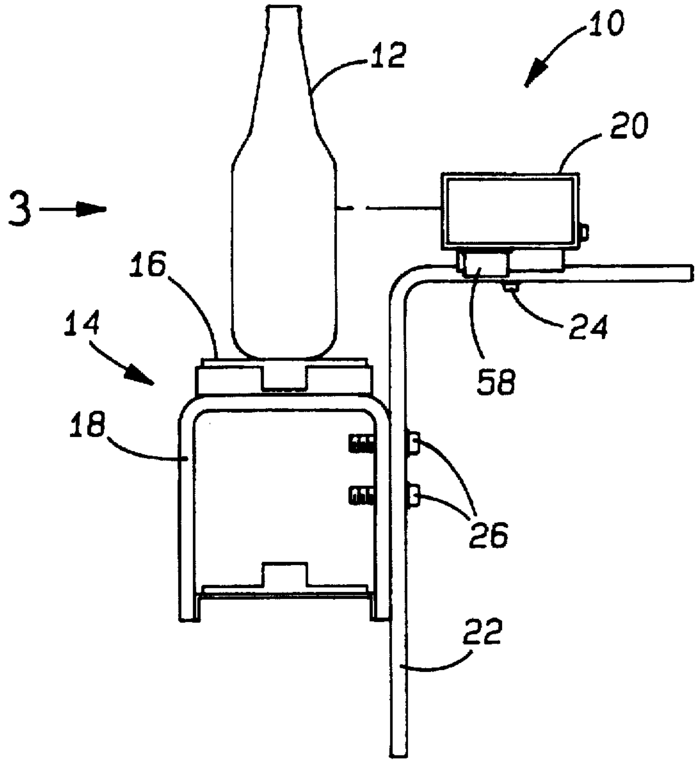
FIG. 1 is an end elevational view of a container detection apparatus in accordance with a presently preferred embodiment of the invention.

The drawings illustrate apparatus 10 in accordance with a presently preferred embodiment of the invention for detecting containers 12 traveling on a container transport conveyor 14. Conveyor 14 includes an endless belt 16 carried by a support 18 and driven by a motor (not shown) for conveying containers 12 in a linear direction through a detection station at which apparatus 10 is mounted. Apparatus 10 includes a rectangular housing 20 adjustably mounted on an L-shaped bracket 22 by a screw 24 that extends upwardly through an elongated slot 27 (FIG. 2) in the horizontal leg of bracket 22. The vertical leg of bracket 22 is adjustably mounted to conveyor support 18 by a pair of screws 26 that extend through a slotted opening in bracket 22. Thus, bracket 22 is vertically adjustable with respect to the plane of conveyor belt 16 by means of screws 26, and housing 20 is horizontally adjustable with respect to conveyor belt 16 by means of screw 24.

A pair of optical proximity sensors 28,30 are adjustably mounted within housing 20. Sensors 28,30 in the preferred embodiment of the invention comprise diffuse reflection type sensors, which radiate diffuse light energy toward containers 12 as the containers pass on conveyor 16, and detect proximity of a container when the container is opposite the sensor by reflection of light energy from the adjacent surface of the container back to the sensor. Sensors 28,30 are oriented such that their respective beams are parallel to each other and at right angles to the longitudinal direction of travel of conveyor 16. With round containers 12 as illustrated by way of example in the drawings, the transmitted light energy from each sensor will be reflected back to the sensor only when the container is substantially directly opposed to the sensor since, at any other position of the container, the transmitted light energy will either miss the container entirely or be reflected by the curved container surface away from the sensor. Sensors 28,30 in the preferred embodiment of the invention comprise PZ101 type sensor marketed by Keyence Corporation of America of Fair Lawn, N.J.

Figure 3:
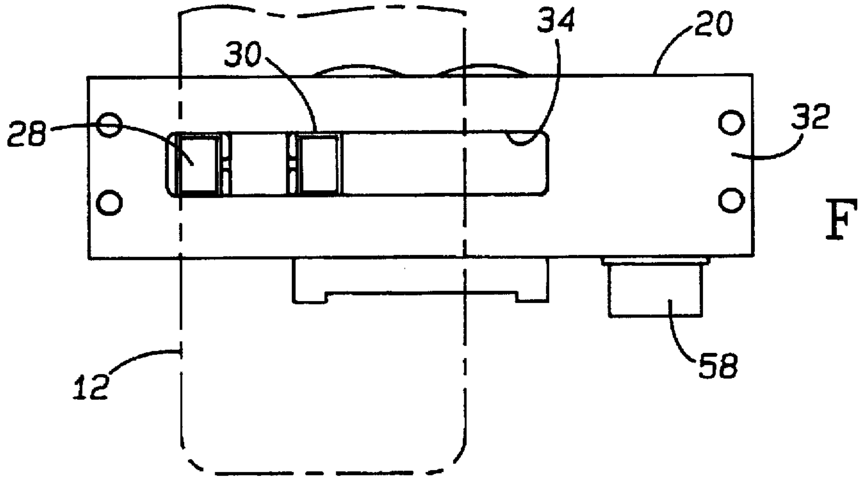
FIG. 3 is a side elevational view of the apparatus of FIG. 1, taken in the direction 3 in FIG. 1 and with a container shown in phantom.
Figure 4:
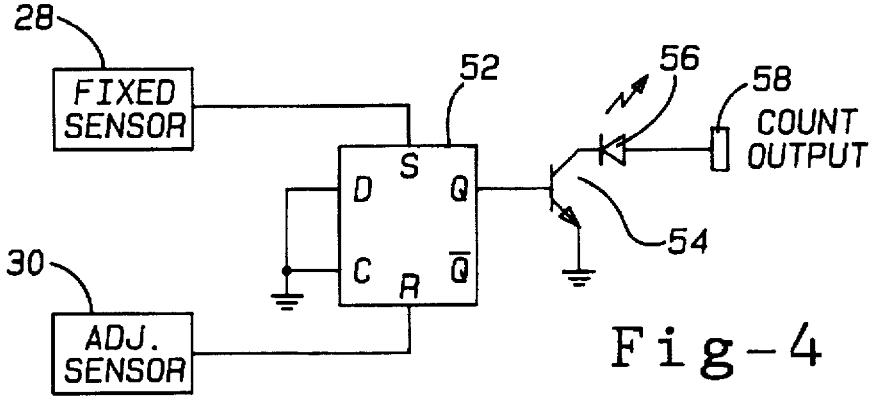
FIG. 4 is an electrical schematic diagram of the container detection apparatus in FIGS. 1–3.

The front wall 32 of housing 20—i.e., the housing wall adjacent to the path of travel of containers 12, has an elongated slot or window 34 through which light from sensors 28,30 is radiated toward containers 12, and light energy from containers 12 is reflected back to the sensors. Each sensor 28,30 is adjustably positionable within housing 20, and is held in fixed adjusted position by means of an associated screw 36,38. The top wall 40 (FIG. 2) of housing 20 also has an elongated window 42 through which sensors 28,30 may be viewed. A pair of scales 44,46 are affixed to top wall 30 along opposed parallel edges of window 42. Each scale 44,46 has associated printed indicia in units of container diameter, in English and metric units respectively. Each sensor 28,30 also includes an associated mechanism 48,50 accessible through window 42 for operator adjustments of sensor sensitivity. The outputs of sensors 28,30 are respectively connected within housing 20 to the set and reset inputs of a D-type latch or flip-flop 52 (FIG. 4). The Q output of flip-flop 52 is connected through a drive transistor 54 and an LED 56 to a connector 58 (FIGS. 1, 3 and 4) from which the detection circuit output is available to external monitoring and display circuitry. LED 56 is disposed on wall 40 of enclosure 20 (FIG. 2) for observation during set-up and operation.

During set-up, bracket 22 is first adjusted by means of screws 26 such that sensor window 34 and sensors 28,30 are opposite the mid portion of the bodies of containers 12 as the containers are transported by conveyor 14 adjacent to apparatus 10. The horizontal position of housing 20 is then adjusted by means of screw 24 so that the housing is approximately one to two inches from the nominal position of containers 12 on conveyor 14. With a test container 12 directly opposite each sensor 28,30, sensor sensitivity is then adjusted by means of elements 48,50 midway between the minimum setting required to trigger on any container and the minimum required to trigger with no container opposite the sensor.

Figure 2:
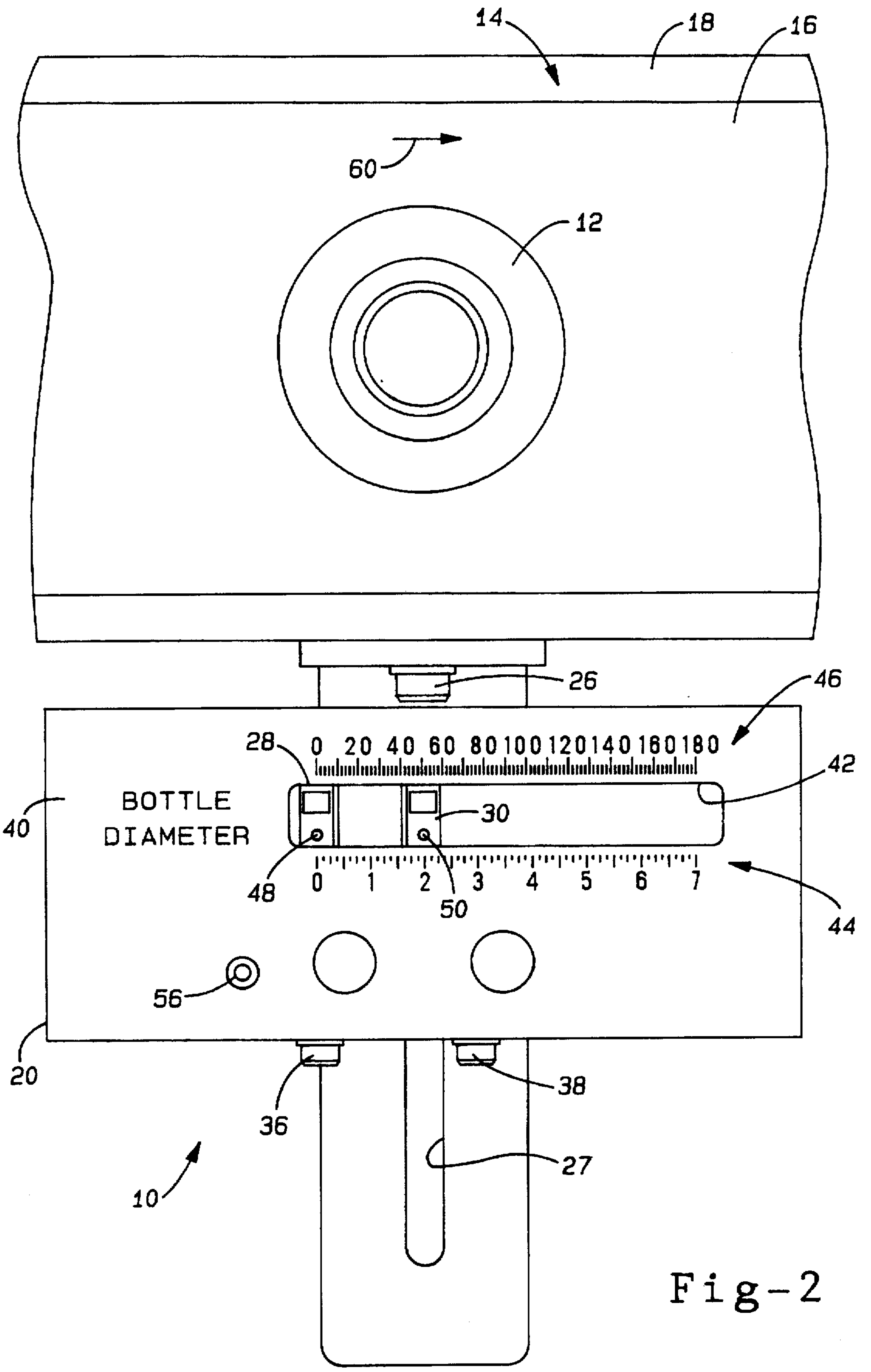
FIG. 2 is a top plan view of the apparatus of FIG. 1 on an enlarged scale.

Sensors 28,30 are also adjusted laterally with respect to each other such that the sensors are spaced from each other in the longitudinal direction of container travel by a distance such that the two sensors do not sense a single container simultaneously. On the other hand, the sensors must be sufficiently close that a given container will be detected by both sensors in sequence before the next container is detected by either sensor. In practice, a distance equal to about one-half of the predetermined diameter of each container 12 is preferred. This is accomplished in accordance with the preferred aspects of the invention by positioning one of the sensors 28 in fixed position at the "zero" reference point of each scale 44,46 (which are aligned with each other at the "zero" position as shown in FIG. 2), and then adjustably positioning the other sensor 30 with respect to scales 44,46 in accordance with the predetermined diameter of the containers 12 to be transported on conveyor 14. Scales 44,46 and associated printed indicia are in units of container diameter and at one-half actual scale, so that positioning of sensor 30 adjacent to the associated indicia on scale 44 or 46 automatically positions the sensors at a spacing equal to about one-half of the container diameter. For example, at the position of sensor 30 illustrated in FIG. 2 for containers 12 of two-inch diameter, actual separation between sensors 28,30 is about one inch.

As containers 12 are then transported by conveyor 14 adjacent to apparatus 10, sensors 28,30 provide associated outputs to flip-flop 52. For example, when conveyors 12 are conveyed in direction 60 (FIG. 1), flip-flop 52 (FIG. 4) is first set by a pulsed output from fixed sensor 28, so as to turn on transistor 54 and illuminate LED 56. When the container then passes adjustable sensor 30, a pulsed output from sensor 30 resets flip-flop 52 and extinguishes LED 56. Note, however, that dithering of container 12 either between sensors 28,30 or after passage of sensor 30 will not reset flip-flop 52 and cause erroneous container counting. That is, once container 12 has set flip-flop 52 by passage adjacent to sensor 28, repassage in the opposite direction due to dithering will not change the state of flip-flop 52. In the same way, once the container has passed sensor 30, repassage in the opposite direction due to dithering or the like will not reset flip-flop 52. In this way, apparatus 10 provides accurate detection of containers while ignoring dithering of the containers due to vibration during back-up and stoppage of container transport. Apparatus 10 may also be employed for dither-free detection of containers moving in the opposite direction.

We claim:

1. Apparatus for detecting and counting containers of prespecified diameter on a moving conveyor comprising:

a pair of optical proximity sensors and means including support means for both of said sensors for positioning said sensors adjacent to the container conveyor such that light energy from said sensors is incident sequentially on the containers as the containers pass on the conveyor adjacent to said sensors, and such that said light energy is reflected sequentially by such containers back to said sensors for detecting proximity of the containers to said sensors, means for adjustably positioning one of said sensors with respect to the other such that said sensors are spaced from each other in the direction of container motion on the conveyor by a distance such that said sensors do not detect proximity of a container at the same time, including a scale affixed to said support means and bearing indicia in units of container diameter at less than full scale for measuring separation between such sensors, and electronic circuit means coupled to said sensors for detecting passage of and counting containers on the conveyor while ignoring any dithering of the containers on the conveyor.

2. The apparatus set forth in claim 1 wherein said printed indicia is in both English and metric units.

3. The apparatus set forth in claim 1 wherein one of said sensors is mounted on said support means adjacent to a "zero" reference point on said scale indicia, and the other of said sensors is adjustably positionable on said support means adjacent to said scale.

4. The apparatus set forth in claim 3 wherein said support means comprises a housing enclosing said sensors, said housing having an elongated window parallel to the conveyor through which containers on the conveyor are exposed to said sensors.

5. The apparatus set forth in claim 1 wherein said electronic circuit means comprises a flip-flop having an output and set and reset inputs, means connecting said sensors to said set and reset inputs respectively, and means connected to said output for detecting passage of a container on the conveyor.

6. The apparatus set forth in claim 1 for detecting and counting containers of specific diameter, wherein sensors are spaced from each other by a distance equal to about one-half of the container diameter.

7. A method of detecting passage of containers of prespecified diameter on a moving conveyor while ignoring any dithering of the containers, comprising the steps of:

(a) positioning a pair of optical proximity sensors adjacent to the container conveyor such that light energy from the sensors is sequentially incident on and reflected from the containers as the containers pass on the conveyor adjacent to the sensors, (b) adjusting position of one of the sensors with respect to the other, by providing a scale adjacent to said sensors bearing indicia in units of container diameter at less than full scale for measuring separation between said sensors, such that placement of said sensors at a separation of said prespecified diameter according to said indicia automatically spaces said sensors from each other in the direction of container motion on the conveyor by a distance less than one container diameter such that a single container is not detected by both sensors simultaneously while a container will be detected by both sensors in sequence before a subsequent container is detected by either sensor.

8. The method set forth in claim 7 wherein said step (a) comprises the step of positioning one of said sensors at a "zero" reference position with respect to said scale indicia; and wherein said step (b) comprises the further step of adjustably positioning the other of said sensors with respect to said scale indicia.

* * * * *